United States Patent
Scheurich et al.

(10) Patent No.: US 12,512,749 B2
(45) Date of Patent: Dec. 30, 2025

(54) METHOD FOR OPERATING AN INVERTER, AND INVERTER

(71) Applicant: SMA Solar Technology AG, Niestetal (DE)

(72) Inventors: Simon Scheurich, Wertheim (DE); Alexander Unru, Baunatal (DE)

(73) Assignee: SMA Solar Technology AG, Niestetal (DE)

( * ) Notice: Subject to any disclaimer, the term of this patent is extended or adjusted under 35 U.S.C. 154(b) by 184 days.

(21) Appl. No.: 18/459,640

(22) Filed: Sep. 1, 2023

(65) Prior Publication Data

US 2023/0412068 A1 Dec. 21, 2023

Related U.S. Application Data

(63) Continuation of application No. PCT/EP2022/055383, filed on Mar. 3, 2022.

(30) Foreign Application Priority Data

Mar. 3, 2021 (DE) .................... 10 2021 105 119.3

(51) Int. Cl.
*H02J 3/38* (2006.01)
*H02J 3/00* (2006.01)
*H02M 1/32* (2007.01)
*H02M 7/797* (2006.01)

(52) U.S. Cl.
CPC ............. *H02M 1/325* (2021.05); *H02J 3/001* (2020.01); *H02J 3/38* (2013.01); *H02M 7/797* (2013.01)

(58) Field of Classification Search
CPC ............ H02J 3/001; H02J 3/38; H02M 1/325; H02M 7/797
See application file for complete search history.

(56) References Cited

U.S. PATENT DOCUMENTS

| | | | |
|---|---|---|---|
| 10,756,536 B2 | 8/2020 | Kral et al. | |
| 11,043,817 B2 | 6/2021 | Cassoli et al. | |
| 2016/0006338 A1 | 1/2016 | Sakimoto et al. | |
| 2017/0141570 A1* | 5/2017 | Vijayan | H02M 3/28 |
| 2022/0140604 A1* | 5/2022 | Patel | H02J 3/50 |
| | | | 700/287 |

FOREIGN PATENT DOCUMENTS

| | | |
|---|---|---|
| DE | 102017106213 A1 | 9/2018 |
| EP | 2963759 A1 | 1/2016 |
| WO | 2016066194 A1 | 5/2016 |

OTHER PUBLICATIONS

International Search Report dated Jul. 25, 2022 for International Application No. PCT/EP2022/055383.

* cited by examiner

*Primary Examiner* — Harry R Behm

(74) *Attorney, Agent, or Firm* — Eschweiler & Potashnik, LLC

(57) ABSTRACT

The application describes operating an inverter having an AC connection, a DC connection and an inverter bridge therebetween. The operation includes operating the inverter in a first mode in which, at the AC connection, an AC grid is supplied with electrical power via the inverter, and the voltage of the AC grid is controlled via a regulation of the inverter. If an increase in a current at the AC connection exceeds a current limit value: changing to a second mode and operating the inverter, wherein a regulation is adapted such that, via a virtual impedance, it limits the current at the AC connection.

14 Claims, 7 Drawing Sheets

METHOD FOR OPERATING AN INVERTER, AND INVERTER

REFERENCE TO RELATED APPLICATIONS

This Application is a Continuation of International Application number PCT/EP2022/055383, filed on Mar. 3, 2022, which claims the benefit of German Application number 10 2021 105 119.3, filed on Mar. 3, 2021. The contents of the above-referenced Patent Applications are hereby incorporated by reference in their entirety.

FIELD

Inverters are used to feed electrical energy from a DC source into a public energy supply grid, for example, in the case of a photovoltaic system. In public energy supply grids, inverters also perform a grid-forming or grid-supporting function.

BACKGROUND

For feeding electrical energy from a DC source into a public energy supply grid, for example, in the case of a photovoltaic system, grid-commutated inverters are predominantly used. These are operated with current control. Voltage-controlled inverters are used as grid-forming inverters in stand-alone grids, but voltage-controlled inverters increasingly perform a grid-forming or grid-supporting function in public energy supply grids.

In the event of a voltage dip due to a grid fault, the inverter must continue to feed into the grid (FRT—fault ride-through) in order to support the voltage. Due to the voltage regulation, in the event of a fault, the current initially rises until a current limitation provided in the inverter becomes active. In order to prevent violation of the maximum current limits, the voltage is then controlled in FRT mode with the help of a virtual impedance.

The change back to grid-forming mode takes place as soon as the voltage again exceeds a predefined threshold value. For this purpose, a fixed optimized value is defined, which, in the event of a change in the grid impedance, must be adjusted anew.

In the case of weak grids or remote short circuits, it can happen that an otherwise optimal value of the threshold value is exceeded too early with the result that FRT mode is quit too early, and the range in which current limitation becomes active is repeatedly entered. On the other hand, in the case of weak grids or remote short circuits, it can also happen that the otherwise optimum value of the threshold value is not reached after the disappearance of the grid fault, which then leads to a permanent continuance in FRT mode.

The technical article of A. Gkountaras, S. Dieckerhoff and T. Sezi, "Evaluation of current limiting methods for grid forming inverters in medium voltage microgrids," 2015 IEEE Energy Conversion Congress and Exposure (ECCE), Montreal, Q C, 2015, pp. 1223-1230, describes various forms of current limitation in grid-forming inverters and, as one form, the use of a virtual impedance.

SUMMARY

In this application, the abbreviation DC (direct current) stands for direct current or direct voltage, and AC (alternating current) stands for alternating current or alternating voltage.

The application is directed to improving the operation of the inverter, in particular in the event of grid faults.

A method is described for operating an inverter having an AC connection, a DC connection and an inverter bridge arranged between the AC connection and the DC connection. The method comprises at least acts S1), S2), S3), S4).

S1) comprises operating the inverter in a first mode of operation in which, at the AC connection, an AC grid is supplied with electrical power via the inverter, and the voltage of the AC grid is controlled via a regulation of the inverter.

S2) comprises, if an increase in the current at the AC connection above a predefined current limit value is recognized:
changing to a second mode of operation and operating the inverter in the second mode of operation, the regulation being adapted in the second mode of operation in such a way that it limits the current at the AC connections by means of a virtual impedance.

S3) comprises, in the second mode of operation:
S3.1) If an increase in the voltage at the AC connection above a predefined threshold value is recognized:
changing to the first mode of operation, and operating the inverter in the first mode of operation. Act S3.1) is a part of act S3).

S4) comprises, in the first mode of operation:
S4.1) if an increase in the current at the AC connection above a predefined current limit value during a time period that exceeds a predefined first time period: changing to the second operating mode with adapted regulation and operating the inverter in the second operating mode, and increasing the threshold value. Act S4.1) is a part of act S4).

The method relates, in one embodiment, to voltage-controlled inverters, which, on the one hand, can be used in a grid-forming manner for a stand-alone grid and, on the other hand, can be used in a grid-supporting and/or grid-forming manner for AC grids connected to the AC connections, for example, public supply grids. In the second operating mode, a grid regulation, for example, an FRT (fault ride-through), is made possible in voltage-controlled operation. This is done with the aid of a virtual impedance. Robust control behavior in an FRT is made possible, for example, in the case of remote faults in rigid or weak AC grids.

If the inverter, after having once been in the second operating mode, changes again to the first operating mode, if a grid fault is again detected by the detection of the rise in the current at the AC connection above the predefined current limit value, there is on the one hand a change back to the second operating mode, and on the other hand, the threshold value for the voltage is raised. This makes it possible to increase the escalation level in this situation and make the inverter more robust against a new change of the operating mode.

In one embodiment of the method, act S3) is executed again after act S4.1). If the inverter then changes again from the second operating mode to the first operating mode and it is then detected again that the current at the AC connection is exceeding the current limit value, the threshold value for the voltage is raised again. In this way, the robustness of the regulation can be further adjusted.

In the event of a voltage drop in the voltage at the AC connection, in the case of grid supply, for example, at the inverter output or at the grid connection point, as a result of a grid fault, the regulation of the inverter leads to an increase in current since the regulation tries to maintain the voltage. The current increase is then limited by the inverter, for example, by hardware current limiting. By detecting the current increase above the predefined current limit value, the presence of a grid fault is inferred from this, and the second operating mode of the inverter, for example, the FRT mode, is activated. In the second operating mode, which can be the FRT mode, the inverter continues to try to maintain the grid voltage, wherein with the help of the virtual impedance the current is prevented from assuming values that lie within the limit range where, for example, the hardware current limiting would intervene. There is a switch from the second operating mode again to the first operating mode, for example, the grid-forming mode, as soon as the voltage has exceeded a predefined threshold value of the voltage. If the current then again assumes values above the current limit value for more than a specific, predefined first time period, for example, between 100 ms and 300 ms, for example, 200 ms, since the grid fault still exists, the threshold value for the voltage is raised, and there is a change again to the second operating mode, for example, the FRT mode. It is advantageous to wait out the first time period in order to cover a settling time for the regulation. Raising the threshold value corresponds to an increase in an escalation level.

In one embodiment, the threshold value can assume a number of predefined discrete values and, at the start of the method, can assume an initial value and, in act S4.1), can also be raised to the next higher of the discrete values. The initial value is a value that the threshold value assumes at the beginning of the method, for example when the inverter is started up and/or while running through act S1.

The escalation level is thus increased stepwise, in one embodiment, depending on how often the inverter has already been operated in the second operating mode. The term escalation level can be considered, for example, as a counter that is incremented here.

In one embodiment, the initial value of the threshold value lies between 80% and 100%, for example, at about 85%, of the nominal voltage of the inverter.

In one embodiment, the distance between at least two adjacent discrete values is between 3% and 7%, for example, approximately 5%, of the nominal voltage of the inverter.

In one embodiment of the method, the distance between any two adjacent discrete values is different.

In one embodiment of the method, the distance between any two adjacent discrete values becomes larger when the values become larger.

In one embodiment of the method, the distance between any two adjacent discrete values becomes smaller when the values become larger.

In one embodiment, the value of the threshold value can be increased, for example, in steps of 5% of the nominal voltage with each increase in the escalation level. The distance between the values, i.e. the step size between the values, can also be variable, i.e. become smaller or larger from a certain escalation level. In one embodiment, step sizes can be assigned to escalation levels, for example, via a value table in the form of a look-up table.

In one embodiment, the method comprises act S4.2) in which, if the inverter is operated in the first operating mode for a time period that exceeds a predefined second time period, the threshold value is lowered to the initial value. Act 4.2) is an optional part of act 4).

In one embodiment, the escalation level can be understood, for example, as a counter that is incremented or decremented. Depending on the escalation level, this results in a threshold value that is increased or decreased compared to the initial value. The escalation level is increased as long as and optionally in several iteration steps until the threshold value lies above the voltage present in the event of a fault, which is reduced by the voltage drop at the virtual impedance, and the system therefore remains stable in the second operating mode. Only when the grid fault has actually disappeared does the voltage then rise again above the threshold value of the voltage increased by the escalation system. In the event of a resulting change to the first operating mode, the system remains stable in this mode without the current increasing again up to the hardware current limit. If this state exists for a predefined second time period, for example 200 ms, the escalation level is reset again by resetting the threshold value to its initial value.

In one embodiment, the method comprises a step S3.2) in which, if the inverter is operated in the second operating mode over a time period that exceeds a predefined third time period, the threshold value is lowered. Step 3.2) is an optional part of step 3).

Hence in this embodiment, if the system is in the second operating mode and the voltage changes positively, the escalation level can be reduced after the predefined third time period to favor leaving the second operating mode. This third time period should be selected to be sufficiently short to allow the threshold value to be lowered successively in several steps, if necessary even during the rise of the voltage. It is also conceivable that an increase in the voltage triggers the reduction of the threshold value and that then the threshold value is successively reduced until it is below the voltage and the second operating mode is exited. In the event of an erroneous lowering of the threshold value, it would then be subsequently raised again by method acts S3) and S4).

In addition to the increase in the threshold value, the threshold value can also be reduced, for example in steps of 5% of the nominal voltage with each increase or decrease in the escalation level. The distance between the values, i.e. the step size between the values, can also be variable when the threshold value is lowered, i.e. can become smaller or larger after a certain escalation level. In one embodiment, it is also possible to assign steps sizes to escalation levels for the reduction, for example via a value table in the form of a look-up table.

In one embodiment of the method, the inverter is operated in the second operating mode at least for a time period that corresponds to a predefined fourth time period. This allows the regulation of the inverter to settle safely before changing back again to the first operating mode. This is advantageous, for example, for the FRT mode, since the fourth time period of FRT regulation allows sufficient time before changing back again to the grid-forming mode.

The operation of the inverter, for example, in the case of grid faults, is therefore further improved in one embodiment by the fact that the method adapts the threshold value by means of an escalation system. According to certain criteria, the escalation level is raised or lowered. The threshold value is then adaptively adjusted depending on the escalation level.

An inverter has an AC connection, a DC connection and an inverter bridge arranged between the AC connection and the DC connection, wherein the inverter can be operated in a first operating mode in which an AC grid is supplied with electrical power at the AC connection via the inverter, and the voltage of the AC grid is controlled by a regulation of the inverter, wherein a control circuit of the inverter is configured to execute the regulation. The control circuit is configured to detect, in the first operating mode, an increase in the current at the AC connection above a predefined current limit value and, in response thereto, to change to a second operating mode, wherein in the second operating mode, the regulation limits the current at the AC connections by means of a virtual impedance. The control circuit is further configured to detect, in the second operating mode, an increase in the voltage at the AC connection above a predefined threshold value and, in response thereto, to change to a first operating mode. If the inverter is repeatedly in the first operating mode, the control circuit will be able to detect an increase in the current at the AC connection above the predefined current limit value during a time period that exceeds a predefined first time period and, in response thereto, to change to the second operating mode and to increase the threshold value.

A DC unit, for example a photovoltaic system, can be connected to the DC connection. The inverter bridge can have a bidirectional design and has switching circuits for converting electrical power that are operated by the control circuit of the inverter. The inverter can therefore also act as a rectifier and, for example, supply a battery as a DC unit with electrical power from, for example, an AC grid.

In one embodiment of the inverter, a number of predefined discrete values that the threshold value can assume are stored in a memory circuit of the inverter, wherein the threshold value when being increased is in each case raised to the next higher of the discrete values.

In one embodiment of the inverter, the regulation is set up to lower the threshold value if the inverter is being operated in the second operating mode over a time period that exceeds a predefined third time period.

BRIEF DESCRIPTION OF THE FIGURES

Examples are explained in more detail below with the aid of figures.

DETAILED DESCRIPTION

Figure 1:
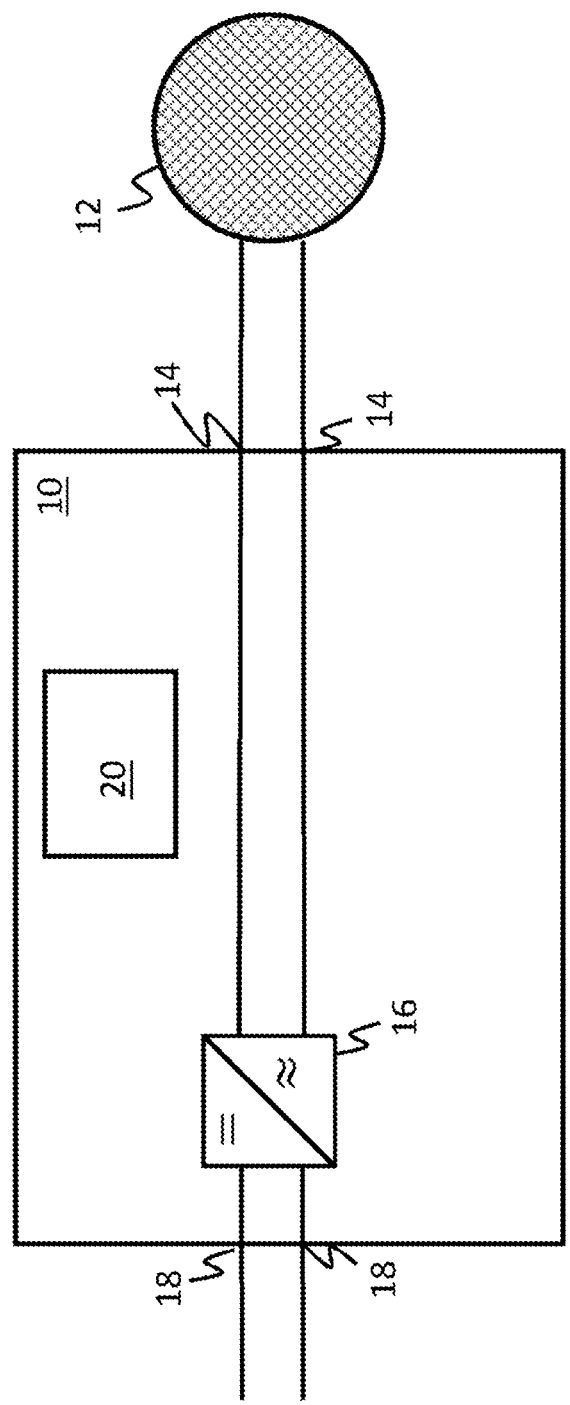
FIG. 1 schematically shows an example embodiment of a system with a voltage supply inverter.

In FIG. 1, a system with a voltage supply inverter 10 is shown schematically. The inverter 10 has a DC connection 18 and an AC connection 14. An inverter bridge 16 is arranged between the DC connection 18 and the AC connection 14 and is configured to convert alternating current or alternating voltage into direct current or direct voltage and vice versa. For this purpose, the inverter bridge 16 has switching circuitry or units that are appropriately controlled by a regulation that runs in a control circuit or unit 20. The regulation of the control circuit 20 sets the voltage U provided at the AC connection. In the shown example, the AC connection 14 corresponds to the grid connection point where an AC grid 12 is connected to the AC connection 14.

A DC system, circuit, or unit, for example, a photovoltaic system, can be connected to the DC connection 18. In the example embodiments described below, the first operating mode, in which an AC grid 12 is supplied at the AC connection 14 with electrical power via the inverter 10 and the voltage of the AC grid 12 is controlled via a regulation of the inverter is, for example, a grid-forming mode, and the second operating mode is an operating mode with adapted regulation, for example, an FRT mode.

Figure 2:
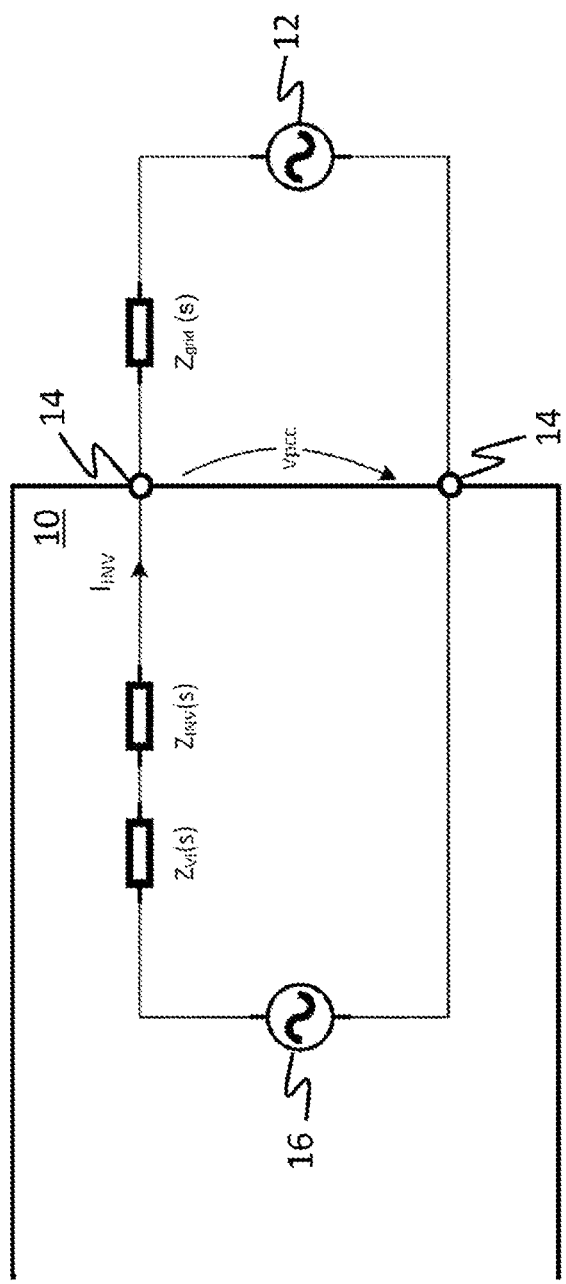
FIG. 2 schematically shows as an equivalent circuit diagram an example embodiment of an inverter in FRT mode.

FIG. 2 schematically shows, as an equivalent circuit diagram, an example embodiment of an inverter in FRT mode. The inverter 10 is characterized by its impedance $Z_{INV}(s)$. The AC grid 12 is characterized by its impedance $Z_{netz}(S)$. In the following, the principle of the virtual impedance $Z_{VI}(s)$ will be illustrated with reference to FIG. 2. In FRT mode the virtual impedance $Z_{VI}(s)$ is taken into account virtually in the regulation—for example, running in the control circuit 20—and causes on the one hand a reduction of the current $I_{INV}$ and, on the other hand, an additional voltage drop, so that the voltage $U=V_{pcc}$ provided in FRT mode by the inverter 10 at the grid connection point—in this example the AC connection 14—is lower by this voltage drop than in the grid-forming mode.

Figure 3:
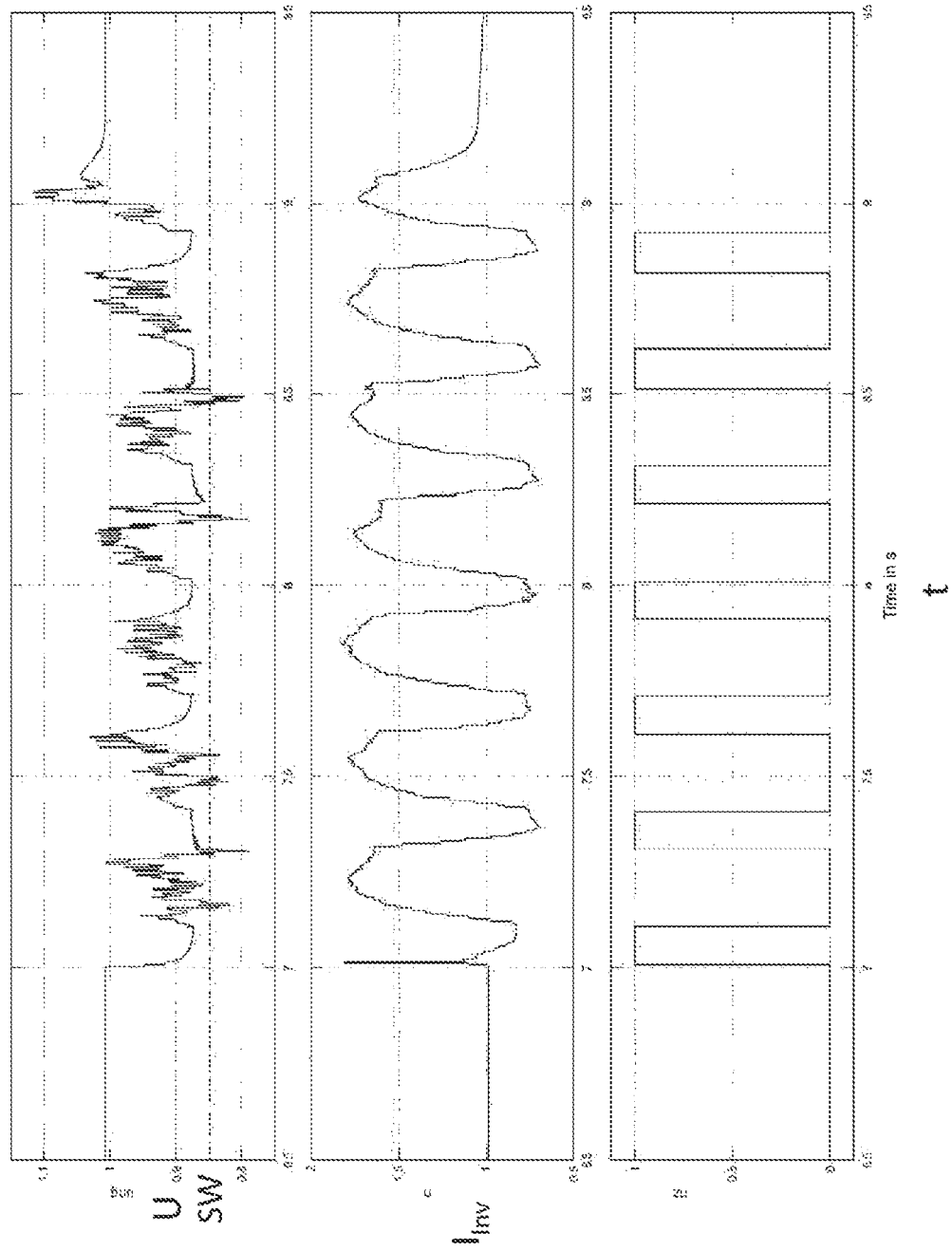
FIG. 3 shows an example of the behavior of voltage and current at the AC connection.

In FIG. 3, the behavior of voltage U—upper graph—and current $I_{INV}$—middle graph—at the AC connection 14 is shown, as is the case when the threshold value SW is too low in the case of weak AC grids or remote short-circuits, and the system therefore continuously changes between FRT mode—1 in the lower graph—and grid-forming mode—0 in the lower graph. At time t=7 s, a grid fault occurs, the voltage U drops and, due to the regulation, the current $I_{INV}$ increases up to the current limit value. The system thereupon changes to FRT mode and remains there for a predefined fourth time period of 100 ms in the shown example. In FRT mode, the current $I_{INV}$ is limited by the virtual impedance $Z_{VI}(s)$, and the voltage U is reduced by the voltage dropping at the virtual impedance $Z_{VI}(s)$. However, since the voltage U still exceeds the selected threshold value SW, shown as a dash-dotted line in the upper graph, the system changes back again to the grid-forming mode, and as a result the current $I_{INV}$ increases—because the virtual impedance $Z_{VI}(s)$ disappears—again up to the current limit value. After waiting for a predefined first time period—200 ms in the shown example—the inverter changes again to FRT mode. This continues until the grid fault has disappeared at time t=9 s and the current $I_{INV}$, after the required settling time of the regulation has elapsed, assumes normal values again.

Figure 4:
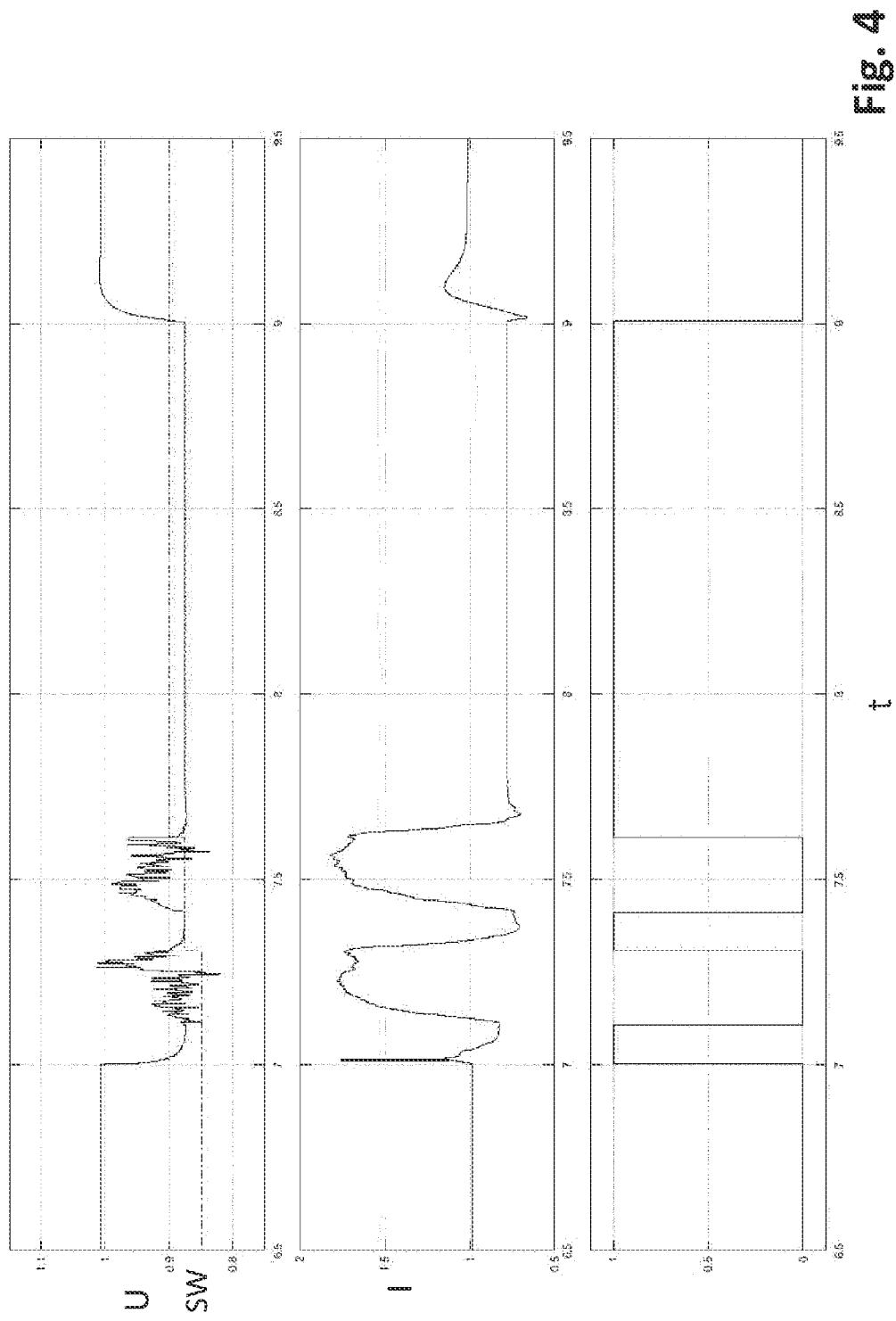
FIG. 4 shows an example of the behavior of voltage and current at the AC connection with an adjusted threshold value.

In FIG. 4, the behavior of voltage U and current $I_{INV}$ at the grid connection point 14 is shown when the threshold value SW—the dash-dotted line in the upper graph—is adjusted using a method described in this application. While the grid fault is present, the system changes back twice from FRT mode to grid-forming mode, as a result of which the threshold value SW is adjusted twice by means of the escalation system before the system then remains stable in FRT mode because the threshold value SW lies above the voltage at the grid connection point 14 reduced by the voltage drop across the virtual impedance $Z_{VI}(s)$. Only with the disappearance of the grid fault at time t=9 s does the voltage rise again above the increased threshold value SW, and the system then changes again to the grid-forming mode.

Figure 5:
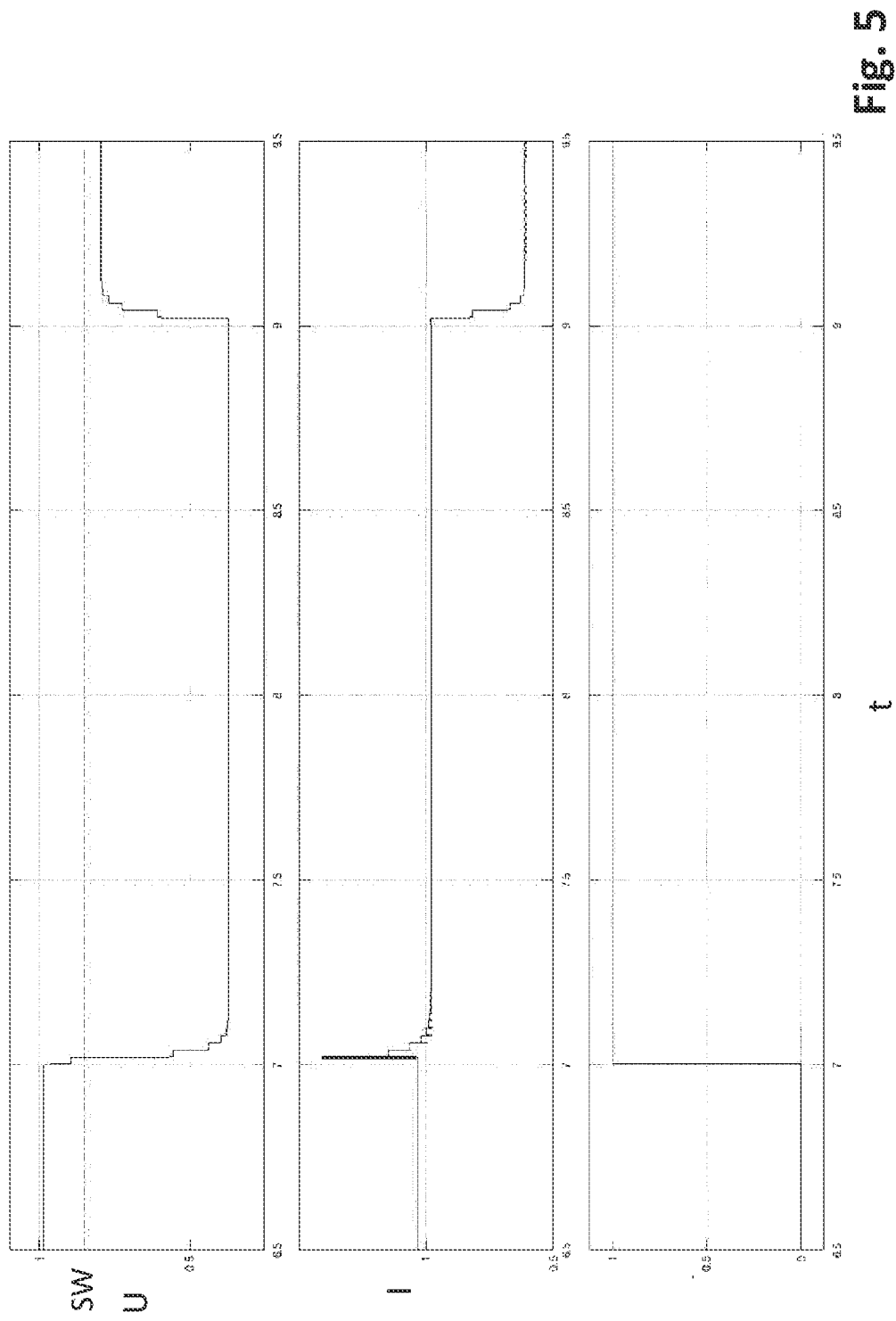
FIG. 5 shows an example of the behavior of voltage and current at the AC connection.

FIG. 5 shows the behavior of voltage U and current $I_{INV}$ at the grid connection point, as it results when the threshold value SW is too high in the case of weak grids or remote short-circuits, and the system therefore remains constantly in FRT mode. Although when the grid fault disappears at time t=9 s the voltage U rises, it is in this case still below the threshold value SW due to the reduction due to the voltage dropping at the virtual impedance $Z_{VI}(s)$ so that FRT mode is not exited.

Figure 6:
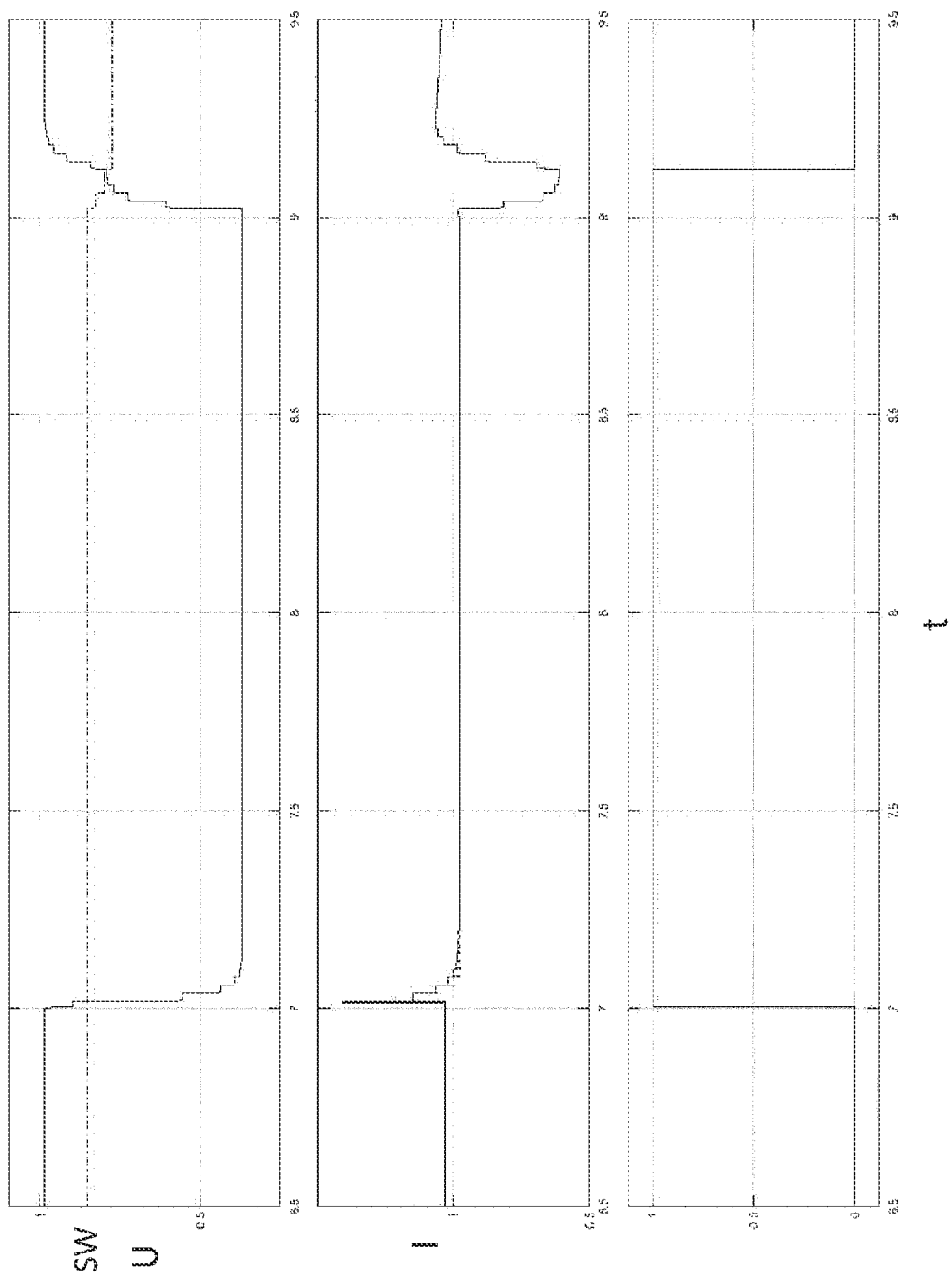
FIG. 6 shows an example of the behavior of voltage and current at the AC connection with an adjusted threshold value.

FIG. 6 shows the behavior of voltage U and current $I_{INV}$ at the grid connection point when the threshold value SW— the dash-dotted line in the upper graph—is adjusted according to an embodiment of the method. At time t=9 s, the grid fault disappears and the voltage rises. The threshold value SW is thereupon successively lowered until the voltage exceeds the threshold value SW and FRT mode is exited.

Figure 7:
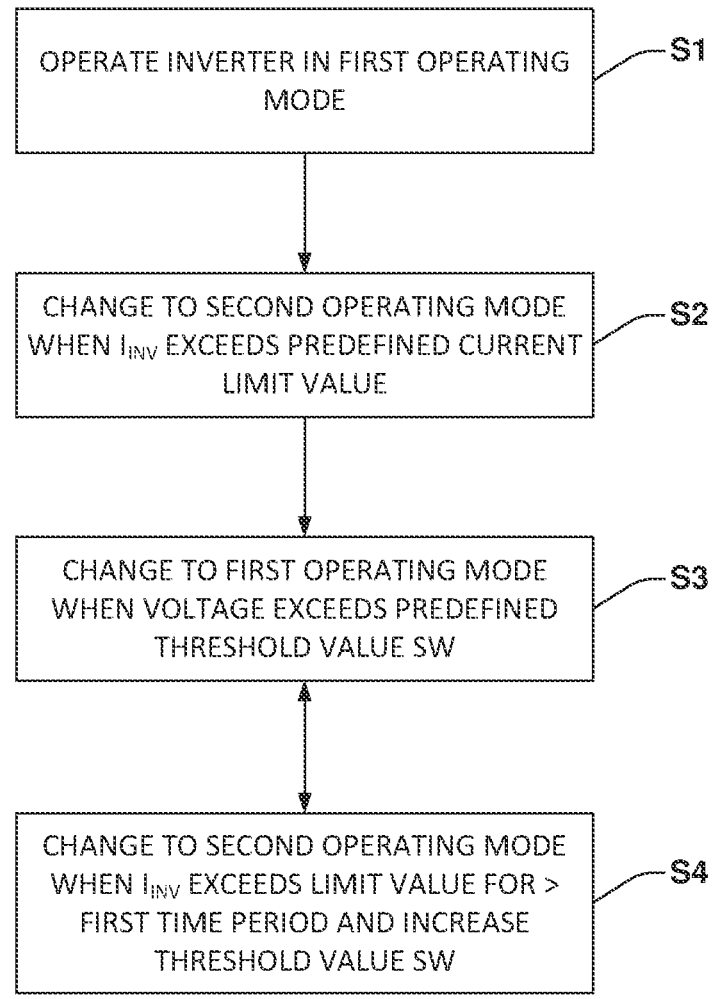
FIG. 7 schematically shows an example embodiment of a method for operating a voltage supply inverter.

FIG. 7 shows a schematic flowchart of an example embodiment of a method for operating a voltage supply inverter.

At S1), the inverter 10 is operated in the first operating mode in which the AC grid 12, for example, a public power supply grid, is supplied with electrical power at the AC connection 14 via the inverter 10, and the voltage of the AC grid 12 is controlled via a regulation of the inverter 10.

At S2), if an increase in the current $I_{INV}$ at the AC connection 14 above a predefined current limit value is recognized, there is a change to the second mode of operation, and subsequently the inverter 10 is operated in the second mode of operation. In the second mode of operation, the regulation is adapted in such a way that it limits the current $I_{INV}$ at the AC connection 14 by means of the virtual impedance $Z_{VI}(s)$.

Act S3) is executed when the inverter 10 is in the second mode of operation. If an increase in the voltage at the AC connection 14 is detected that exceeds a predefined threshold value SW, there is a change to the first mode of operation, and the inverter is subsequently operated in the first mode of operation.

Act S4) is executed when the inverter 10 has changed to the first mode of operation from act S3). If an increase in the current $I_{INV}$ at the AC connection 14 is detected that exceeds a predefined current limit value during a time period that exceeds a predefined first time period, there is a change to the second operating mode, the inverter 10 is subsequently operated in the second operating mode, and the threshold value SW is increased. After act S4—upon a change back to the second operating mode—act S3) is then executed again.

If the inverter 10 is operated in the first operating mode over a time period that exceeds a predefined second time period, the threshold value SW is set to its initial value.

If the inverter 10 is operated in the second operating mode over a time period that exceeds a predefined third time period, the threshold value SW is optionally lowered.

Alternatively, as shown for example in FIG. 6, if in the second operating mode the current $I_{INV}$ at the AC connection 14 falls below a predefined further current limit value, or if an increase, in particular a sharp increase, in the voltage U is detected, for example, by evaluating a voltage gradient, the threshold value SW for the voltage U is reduced in a stepwise fashion. In this approach, the threshold value SW can also be reduced to a value that is below the initial value.

What is claimed is:

1. A method for operating an inverter having an AC connection, a DC connection and an inverter bridge arranged between the AC connection and the DC connection, comprising:
    operating the inverter in a first operating mode in which an AC grid is supplied with electrical power at the AC connection via the inverter, and a voltage of the AC grid is controlled via a regulation of the inverter,
    if an increase in a current at the AC connection is detected that exceeds a predefined current limit value: changing to a second operating mode and operating the inverter in the second operating mode, wherein in the second operating mode, the regulation is adapted such that it limits the current at the AC connection by means of a virtual impedance,
    in the second operating mode: if an increase in the voltage at the AC connection is detected that exceeds a predefined threshold value: changing to the first operating mode and operating the inverter in the first operating mode,
    in the first operating mode: if an increase in the current at the AC connection is detected that exceeds the predefined current limit value during a time period that exceeds a predefined first time period: changing to the second operating mode and operating the inverter in the second operating mode, and increasing the predefined threshold value.

2. The method according to claim 1, wherein the changing to the first operating mode upon a detection of the voltage at the AC connection exceeding the predefined threshold value is performed again after changing to the second operating mode upon the detection of the current at the AC connection exceeding the predefined current limit value.

3. The method according to claim 1, wherein the predefined threshold value is selected from a number of predefined discrete values and, at a start of the method, assumes an initial value and, in the first operating mode is raised to a next higher of the discrete values.

4. The method according to claim 3, wherein the initial value lies between 80% and 100% of a nominal voltage of the inverter.

5. The method according to claim 3, wherein a distance between at least two adjacent discrete values is between 3% and 7% of a nominal voltage of the inverter.

6. The method according to claim 3, wherein a distance between any two adjacent discrete values is different.

7. The method according to claim 3, wherein a distance between any two adjacent discrete values becomes larger when the discrete values become larger.

8. The method according to claim 3, wherein a distance between any two adjacent discrete values becomes smaller when the values become larger.

9. The method according to claim 3, further comprising:
    if the inverter is operated in the first operating mode over another time period that exceeds a predefined second time period, lowering the threshold value to the initial value.

10. The method according to claim 3, further comprising:
    if the inverter is operated in the second operating mode over another time period that exceeds a predefined third time period, lowering the threshold value.

11. The method according to claim 1, wherein the inverter is operated in the second operating mode at least for another time period that corresponds to a predefined fourth time period.

12. An inverter having an AC connection, a DC connection, and an inverter bridge arranged between the AC connection and the DC connection, wherein the inverter is configured to operate in a first operating mode in which an AC grid is supplied with electrical power at the AC connection via the inverter, and a voltage of the AC grid is controlled via a regulation of the inverter, wherein a control circuit of the inverter is configured to carry out the regulation of the inverter, and wherein the control circuit is further configured to:
    in the first operating mode: detect an increase in a current at the AC connection above a predefined current limit value and, in response thereto, change to a second operating mode, wherein in the second operating mode, the regulation limits the current at the AC connection via a virtual impedance,
in the second operating mode: detect an increase in the voltage at the AC connection above a predefined threshold value and, in response thereto, change to the first operating mode,
in the first operating mode: detect an increase in the current at the AC connection above the predefined current limit value during a time period that exceeds a predefined first time period and, in response thereto, change to the second operating mode and to increase the threshold value.

13. The inverter according to claim 12, wherein a number of predefined discrete values that the threshold value can assume are stored in a memory circuit of the inverter, wherein the threshold value when being increased is in each case raised to a next higher one of the discrete values.

14. The inverter according to claim 12, wherein the regulation is configured to lower the threshold value if the inverter is operated in the second operating mode over another time period that exceeds a predefined third time period.

\* \* \* \* \*